United States Patent Office 2,746,998
Patented May 22, 1956

---

2,746,998

CHLORINATION PROCESS

David Brown and John W. Colton, New York, and Ralph Landau, East Hills, N. Y., assignors to Chempatents, Inc., New York, N. Y., a corporation of Delaware No Drawing. Application October 18, 1954,
Serial No. 463,068

7 Claims. (Cl. 260—654)

This invention relates to processes for the chlorination of aliphatic hydrocarbons, more particularly, to processes for making perchloroethylene and carbon tetrachloride by the thermal chlorination of aliphatic hydrocarbons and their partially chlorinated derivatives, and more particularly, it relates to such processes wherein the reactor effluent is quenched with aqueous hydrochloric acid containing at least about 19% hydrogen chloride by weight.

Perchloroethylene and carbon tetrachloride have achieved considerable commercial success. They may be prepared by the direct thermal chlorination of aliphatic hydrocarbons having about 1 to 4 or more carbon atoms in the molecule, the general preference being 1 to 3 carbon atoms. The chlorination reaction is carried out at relatively high temperatures of the order of about 500 to 700° C. or higher, the general preference being temperatures of about 550 to 650° C. The desired product is recovered by fractionation.

A major problem in connection with the preparation of either perchloroethylene or carbon tetrachloride by this type process in relatively high yields is the obtention of a crude product of relatively high purity with minimum amounts of undesirable by-products. One proposal made heretofore in connection with this type process is the quenching of the hot exit gases from the reactor by liquid chlorinated hydrocarbons; but this leaves much to be desired, especially from the viewpoint of forming substantial amounts of undesirable by-products. Another aspect of the process is the economic recovery of the relatively large amounts of hydrogen chloride formed as a side product.

The discoveries associated with the invention and related to the solution of the above problems, and objects achieved in accordance with the invention include the following: the provision of a process for preparing perchloroethylene or carbon tetrachloride by the thermal chlorination of aliphatic hydrocarbons having 1 to 4 carbon atoms in the molecule or their partially chlorinated derivatives or both, wherein the hot exit gases from the reactor are rapidly quenched by liquid aqueous hydrochloric acid containing at least 19% hydrogen chloride by weight, whereby formation of undesirable by-products during the cooling step is minimized; the provision of such a process wherein side product hydrogen chloride is recovered in concentrated form; the provision of such a process wherein perchloroethylene or carbon tetrachloride product is recovered by fractionation; and other objects which will be apparent as details or embodiments of the invention as set forth hereinafter.

In order to facilitate a clear understanding of the invention the following preferred specific embodiments are described in detail.

*Example 1*

Using a reaction mixture of methane and chlorine together with diluent which may contain carbon tetrachloride, perchloroethylene and hydrogen chloride (which diluent may be recycled from the reaction or separation system if desired), passing it into a reactor under known conditions, reaction occurs with the formation of perchloroethylene or carbon tetrachloride or both, together with the side products, hydrogen chloride. The hot exit gases from the reactor are rapidly cooled by contact with a liquid stream containing aqueous hydrochloric acid of about 21 to 36% hydrogen chloride concentration.

Uncondensed vapors (from the quench) are cooled, liquified and recycled to the quench. The cooled uncondensed gases may be purged in part as needed to reduce the amount of any inerts present, and the remainder may be recycled to the reactor feed.

The liquid from the quench is separated into two layers, an upper aqueous layer and a lower organic chloride layer. A part of the aqueous liquid is cooled and circulated back to the quench so that the liquid enters the quench at a temperature of about 45 to 50° C. and leaves the quench at a temperature of about 60° C. Alternatively, the total liquid from the quench may be cooled and recycled. Water may be added to the quench as needed.

The upper aqueous layer is fractionated to recover a concentrated aqueous hydrochloride acid side product. If desired, an anhydrous hydrogen chloride side product may be recovered by known stripping and fractionation methods; e. g., as described in Industrial and Engineering Chemistry, vol. 41, 2165–7, (October 1949).

The bottom or organic chloride layer is fractionated. Volatile impurities may be removed or recycled. Carbon tetrachloride may be separated and a part thereof may be recycled. Heavy ends may be removed. Pure perchloroethylene product is recovered.

The hot exit gases from the reactor are rapidly quenched with the liquid aqueous hydrochloric acid, the temperature and amount of liquid contacted with the exit gases being such as to bring the gaseous mixture down to a temperature of about 60° C.

The invention is associated with the surprising discovery that by means of the very rapid cooling in the quench, the formation of undesirable by-products is minimized; e. g., about three-fold lower than prior art type processes using a chlorinated hydrocarbon quench.

This process may be operated in a continuous manner, and the particular quenching method minimizes any operational difficulties due to the presence of any small amount of hexachlorobenzene or hexachloroethane as may be formed; i. e., avoiding such troubles as deposition of solid materials of this type in columns, condensers or lines.

Using a net feed of 1 mol of methane and 3 mols of chlorine, about 4.0 mols of hydrogen chloride is recovered as a side product together with almost 0.48 mol of perchloroethylene.

*Example 2*

The procedure of Example 1 is followed except that the net feed is 1 mol of ethane with 5 mols of chlorine, and there are obtained 0.94 mol perchloroethylene, about 6 mols of hydrogen chloride, and a very small amount of heavy ends.

*Example 3*

The procedure of Example 1 is followed except that the net feed is 1 mol of propane and 5.5 mols of chlorine and there are obtained 1.4 mols perchloroethylene, about 8.0 mols of hydrogen chloride, and a very small amount of heavy ends.

In the foregoing examples, when perchloroethylene is desired as the major product, the recycled diluent contains a substantial amount of carbon tetrachloride with only a minor amount of perchloroethylene, if any. Carbon tetrachloride may be produced as the desired product, at the expense of perchloroethylene production, by reducing the ratio of hydrocarbon to chlorine fed to the reactor and simultaneously reducing the reactor temperature; in this case, the recycled diluent contains a substantial proportion of perchloroethylene.

Comparable results to the foregoing are achieved with various modifications such as the following. The hydrocarbon reactant may be typified by methane, ethane, propane, butane, butene, propylene, ethylene or acetylene. Any suitable thermal chlorination condition may be used. The aqueous quench liquid may contain about 19 to 36% hydrochloric acid.

In view of the foregoing disclosures, variations and modifications thereof will be apparent to one skilled in the art and it is intended to include within the invention all such variations and modifications except as do not come within the scope of the appended claims.

We claim:

1. In a process for the preparation and recovery of chlorinated hydrocarbons and hydrogen chloride by the thermal chlorination of a member of the group consisting of aliphatic hydrocarbons having 1 to 4 carbon atoms in the molecule and partial chlorination derivatives thereof, the improvement which comprises rapidly quenching the hot exit gases from the reactor with a liquid body essentially containing liquid aqueous hydrochloric acid of at least 19% hydrogen chloride.

2. A process of claim 1 wherein the chlorinated hydrocarbon product is perchloroethylene.

3. A process of claim 1 wherein the chlorinated hydrocarbon product is carbon tetrachloride.

4. A process of claim 1 wherein the hydrocarbon reactant is methane.

5. A process of claim 1 wherein the hydrocarbon reactant is ethane.

6. A process of claim 1 wherein the hydrocarbon reactant is propane.

7. A process of claim 1 wherein the hydrocarbon reactant is propylene.

References Cited in the file of this patent

UNITED STATES PATENTS

| | | |
|---|---|---|
| 1,950,720 | Egloff | Mar. 13, 1934 |
| 2,321,472 | Engs et al. | June 8, 1943 |